Patented Mar. 13, 1951

2,545,096

UNITED STATES PATENT OFFICE 2,545,096

NAPHTHYL-AMINO-PROPANEDIOLS

Loren M. Long, Grosse Pointe Woods, and Harvey D. Troutman, Ferndale, Mich., assignors to Parke, Davis & Company, Detroit, Mich., a corporation of Michigan No Drawing. Application January 21, 1950, Serial No. 139,960

9 Claims. (Cl. 260—501)

This application is a continuation in part of our co-pending application Serial No. 83,770, filed March 26, 1949, now U. S. Patent 2,516,130, and the invention relates to new amino diols and to chemical methods useful for their synthesis. More particularly, the invention relates to naphthyl amino diols and their acid addition salts and to methods for obtaining these products. The amino diol compounds of the invention in their free base form can be represented by the formula,

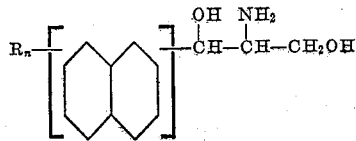

where $n$ is one of the integers 1 or 2 and R is the same or different and represents hydrogen, halogen, nitro, lower alkyl or lower alkoxy radicals.

It will be appreciated by those skilled in the art that the amino diols of the invention and the starting materials used in their preparation can exist in structural as well as optical isomeric forms. The term "structural" isomer or form as used herein refers to the cis or trans, that is, the planar relationship of the polar groups on the asymmetric carbon atoms. To differentiate between these two possible diastereoisomers we will subsequently refer to the cis compounds as the "regular" (reg.) series or form and to the trans diastereoisomers as the "pseudo" ($\psi$) series or form. Such cis compounds are products wherein the two most highly polar of the groups on the asymmetric carbon atoms lie on the same side of the plane of the two carbon atoms. Conversely, the trans or pseudo compounds are those wherein the two most highly polar groups lie on opposite sides of the plane of the two carbon atoms.

Both the regular and pseudo forms exist as racemates of the optically active dextro (d) and levo (l)-rotary isomers as well as in the form of the individual or separated dextro (d) and levo (l) optical isomers.

Because of the difficulty of representing these structural differences in graphic formulae the customary structural formulae will be used in both the specification and claims and a notation placed below or to the side of the formula to designate the particular structural and optical configuration of the compound. Where the formula represents the unresolved mixture of the structural and optical isomers the notation "unresolved" will be used. However, it should be expressly understood that where no notation appears with a structural formula that the formula should be interpreted in its generic sense, that is, as representing the (l)-$\psi$, (d)-$\psi$, (l)-reg. or (d)-reg. isomers in separated form as well as the (dl)-$\psi$ or (dl)-reg. optical racemates or the total unresolved mixture of structural and optical isomers. Such a formula does not merely represent the unresolved mixture of isomers.

In accordance with the invention amino diols of the above general formula are produced by hydrolyzing an acylated amino diol of the formula,

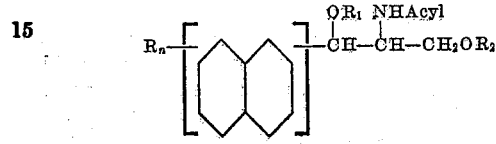

where $R_1$ and $R_2$ are the same or different and represent hydrogen or acyl radicals. The term "acyl" as used herein includes saturated and unsaturated lower aliphatic acyl, halogen substituted lower aliphatic acyl, carboxy substituted lower aliphatic acyl, cyano substituted lower aliphatic acyl, ether substituted lower aliphatic acyl, ester substituted lower aliphatic acyl, hydroxy substituted lower aliphatic acyl, benzoyl, substituted benzoyl, araliphatic acyl, furoyl, pyridinoyl and the like radicals.

In carrying out the hydrolysis acidic or alkaline conditions can be used. However, we prefer to hydrolyze using dilute mineral acid since it is more efficient in bringing about hydrolysis in a shorter time. When acidic hydrolytic conditions are used, the substituted amino diol product is present in the reaction mixture in the form of an acid addition salt and it can either be isolated in this form or it can be neutralized and isolated as the free base. If desired, the hydrolysis may be carried out in a medium containing a water miscible organic solvent such as methanol, ethanol, dioxane, acetone, n-propanol, methyl ethyl ketone and the like. The reaction may be effected over a wide temperature range but is preferably carried out at the boiling point of the reaction mixture. Some specific examples of the hydrolytic catalysts or reagents which can be employed are hydrochloric acid, hydrobromic acid, hydriodic acid, sulfuric acid, phosphoric acid, sodium hydroxide, potassium hydroxide, lithium hydroxide, barium hydroxide, sodium carbonate, potassium carbonate and the like.

As stated above, the acid addition salts of the amino diols may be prepared directly by hydrolysis. These salts may also be prepared by the reaction of the free base with the corresponding organic or inorganic acid. Some examples of these acid addition salts are the hydrochloride, hydrobromide, hydriodide, sulfate, sulfamate, oxalate, tartrate, citrate, benzoate, maleate, succinate, acetate and the like.

In order to prepare a particular optical isomer of the amino diols, or acylated derivatives thereof, the corresponding individual, regular or pseudo, forms of the 1-(1-naphthyl)-2-aminopropane-1,3-diol are resolved into the optical isomers via an optical active addition salt. This resolution, which must be carried out on the free amino diol, is performed by forming an acid addition salt of the racemic amine with an optically active acid such as (d)-tartaric, (l)-tartaric, (d)-mandelic, (l)-mandelic, (d)-bromcamphor sulfonic, (l)-bromcamphor sulfonic, (d)-camphor sulfonic, and (l)-camphor sulfonic acids, separating the two isomeric salts by recrystallization from a solvent, such as a lower aliphatic alcohol or mixtures of the same with water or other organic solvents, and then regenerating the individual optical isomers from the separated optically active acid addition salts by neutralizing each one separately. When carrying out this resolution, it is desirable but not absolutely necessary to choose the form of the optically active acid so that the desired optical isomer will separate from the crystallization solution first.

The process of resolution of the naphthyl amino diols described above is also described and claimed in our copending application Ser. No. 139,958, filed under even date herewith.

The amino diols of the invention and their acid addition salts are valuable intermediates for the preparation of other organic compounds. They are of particular value in the preparation of organic compounds possessing antibiotic activity.

The invention is illustrated by the following examples:

Example 1

25 g. of (dl)-ψ-1-(1-naphthyl)-2-acetamidopropane-1,3-diol is heated with 600 cc. of 5% hydrochloric acid for twelve hours. The reaction mixture is cooled and the hydrochloride salt of (dl)-ψ-1-(1-naphthyl)-2-aminopropane-1,3-diol which separates is collected and washed with a small amount of water. The hydrochloride salt thus obtained is dissolved in water or suspended therein and the mixture treated with an excess of concentrated ammonium hydroxide. The (dl)-ψ-1-(1-naphthyl)-2-aminopropane-1,3-diol free base which separates is collected, washed with a small amount of water and purified by recrystallization from water. The formula of this product is,

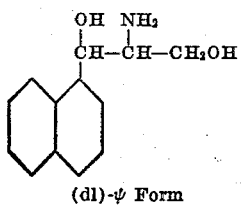

(dl)-ψ Form 5 g. of (dl)-ψ-1-(1-naphthyl)-2-aminopropane-1,3-diol is dissolved in a minimum amount of water containing a small amount of methanol and the resulting solution is treated with an aqueous solution containing an equivalent amount of (d)-tartaric acid. The solution is evaporated to dryness in vacuo and the residue fractionally crystallized from a minimum amount of hot methanol. The first isomer to separate from the solution in crystalline form is the (d)-tartaric acid salt of (l)-ψ-1-(1-naphthyl)-2-aminopropane-1,3-diol. The (d)-tartaric acid salt of (d)-ψ-1-(1-naphthyl)-2-aminopropane-1,3-diol is recovered from the filtrate after removal of the salt of the (l) isomer.

The d-tartaric acid salt of (l)-ψ-1-(1-naphthyl)-2-aminopropane-1,3-diol obtained above is dissolved in water, the solution made alkaline to pH 9 with sodium hydroxide solution and the precipitated (l)-ψ-1-(1-naphthyl)-2-aminopropane-1,3-diol free base is collected. The formula of this product is,

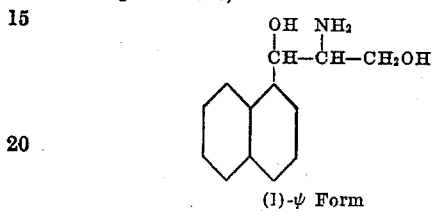

(l)-ψ Form

By decomposing the (d)-tartaric acid salt of (d)-ψ-1-(1-naphthyl)-2-aminopropane-1,3-diol in the manner described above for the (l) isomer, one obtains the free base of (d)-ψ-1-(1-naphthyl)-2-aminopropane-1,3-diol. If desired, the (d)-tartaric acid used above may be replaced by (d)-camphor sulfonic acid. In this instance, it is preferable to use a reaction mixture consisting of isopropanol or n-butanol rather than the methanol used in the fractional crystallization of the tartrate salt.

The hydrochloride salt of (l)-ψ-1-(1-naphthyl)-2-aminopropane-1,3-diol,

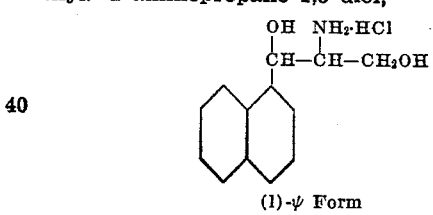

(l)-ψ Form is prepared by treating an aqueous solution of the free base with one equivalent of hydrochloric acid. Evaporation of this acidified solution in vacuo yields crystals of the hydrochloride acid addition salt of the above formula.

Example 2

20 g. of (dl)-ψ-1-(4-methoxy-2-naphthyl)-2-phenylacetamidopropane-1,3-diol is heated for twelve hours under reflux with 650 cc. of 5% hydrobromic acid. The reaction mixture is cooled and the insoluble hydrobromide salt of (dl)-ψ-1-(4-methoxy-2-naphthyl)-2-aminopropane-1,3-diol is collected, the solid dissolved in water, the solution made alkaline with sodium hydroxide to pH 10 and the free base of (dl)-ψ-1-(4-methoxy-2-naphthyl)-2-aminopropane-1,3-diol which separates is collected. This product has the formula,

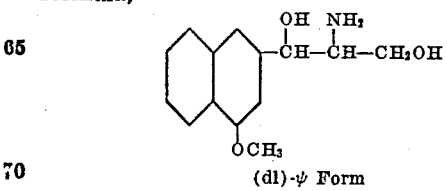

(dl)-ψ Form

Example 3

25 g. of (dl)-ψ-1-(4-nitro-1-naphthyl)-2-acetamidopropane-1,3-diol is added to 800 cc. of 5% hydrochloric acid and the resulting mixture heated under reflux for about twelve hours. The reaction mixture is cooled and the hydrochloride salt of (dl)-ψ-1-(4-nitro-1-naphthyl)-2-aminopropane-1,3-diol which separates is collected and dissolved or suspended in water. The aqueous mixture is treated with an excess of concentrated ammonium hydroxide and the free base of (dl)-ψ-1-(4-nitro-1-naphthyl)-2-aminopropane-1,3-diol is collected and purified by recrystallization from water. The formula of this product is,

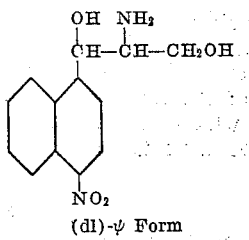

(dl)-ψ Form

Preparation of the optically active (d)-tartaric acid addition salt of the above prepared (dl)-ψ-1-(4-nitro-1-naphthyl)-2-aminopropane-1,3-diol and fractional crystallization of the (d)- and the (l)-salts leads to two crystalline products which upon hydrolysis yield separately (d)-ψ-1-(4-nitro-1-naphthyl)-2-aminopropane-1,3-diol and (l)-ψ-1-(4-nitro-1-naphthyl)-2-aminopropane-1,3-diol. These optically active bases may be converted to the corresponding hydrochloride acid addition salts by the procedure described in Example 1.

*Example 4*

5 g. of (dl)-reg.-1-(5-ethyl-1-naphthyl)-2-benzamido-3-dichloroacetoxypropane-1-ol is refluxed with 100 cc. of 5% sulfuric acid for four hours. The reaction mixture is evaporated to one-half volume in vacuo, the solution made alkaline to pH 10 with sodium hydroxide and extracted with ethyl acetate. The ethyl acetate extracts are dried and the ethyl acetate distilled to obtain the free base of (dl)-reg.-1-(5-ethyl-1-naphthyl)-2-aminopropane-1,3-diol of the formula,

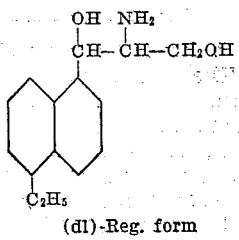

(dl)-Reg. form

*Example 5*

5 g. of the tris(methoxyacetate) of (l)-ψ-1-(8-bromo-2-naphthyl)-2-aminopropane-1,3-diol is heated under reflux with 100 cc. of 5% potassium hydroxide solution. After about three hours of heating the reaction is cooled, extracted with ethyl acetate, the extract is washed with water, dried and the ethyl acetate distilled. The product thus obtained is (l)-ψ-1-(8-bromo-2-naphthyl)-2-aminopropane-1,3-diol of the formula,

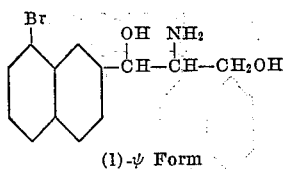

(l)-ψ Form 1 g. of the above free base dissolved in a small amount of isopropanol is added to a warm isopropanol solution containing one equivalent of oxalic acid monohydrate. The resulting mixture is evaporated to dryness in vacuo and the crystalline half-acid oxalate salt of (l)-ψ-1-(8-bromo-2-naphthyl)-2-aminopropane-1,3-diol is purified by recrystallization from isopropanol.

*Example 6*

4 g. of the tribenzoate of (l)-reg.-1-(3,6-dichloro-1-naphthyl)-2-aminopropane-1,3-diol is heated under reflux for three hours with 75 cc. of alcoholic 5% hydrobromic acid. The reaction mixture is evaporated to dryness in vacuo and the residue consists of the hydrobromide salt of (l)-reg.-1-(3,6-dichloro-1-naphthyl)-2-aminopropane-1,3-diol. A mixture of this salt with 75 cc. of water is made alkaline to pH 10 with sodium hydroxide solution. The solution is extracted with ethyl acetate and the extract washed with water, dried and the solvent distilled to obtain the desired (l)-reg.-1-(3,6-dichloro-1-naphthyl)-2-aminopropane-1,3-diol of the formula,

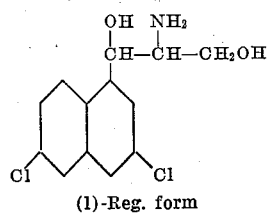

(l)-Reg. form

*Example 7*

7 g. of the triacetate of (d)-ψ-1-(4-methyl-7-ethoxy-1-naphthyl)-2-aminopropane-1,3-diol is heated with 250 cc. of 5% hydrochloric acid for about three hours; then the reaction mixture is evaporated to dryness in vacuo. The residue which consists of (d)-ψ-1-(4-methyl-7-ethoxy-1-naphthyl)-2-aminopropane-1,3-diol hydrochloride of the formula,

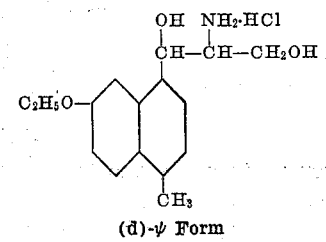

(d)-ψ Form is taken up in water, the solution made alkaline to pH 10 with sodium hydroxide and then extracted with two portions of ethyl acetate. The ethyl acetate extracts are dried and the ethyl acetate distilled to obtain the free base of (d)-ψ-1-(4-methyl-7-ethoxy-1-naphthyl)-2-aminopropane-1,3-diol which has the formula,

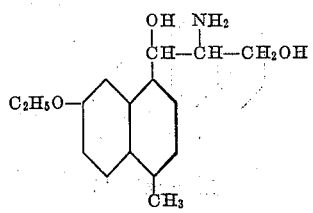

(d)-ψ Form

*Example 8*

7 g. of (dl)-ψ-1-(2-naphthyl)-2-furamido-3-furoyloxypropane-1-ol is heated under reflux for three hours with 100 cc. of 5% hydrobromic acid and then the reaction mixture is evaporated to dryness in vacuo. The residual hydrobromide salt is taken up in water, the solution made alkaline to pH 10 with potassium hydroxide and extracted with ethyl acetate. The extracts are washed with water, dried and the ethyl acetate distilled to obtain the desired (dl)-ψ-1-(2-naphthyl)-2-aminopropane-1,3-diol of the formula,

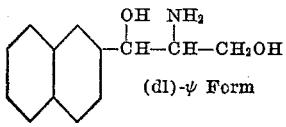
(dl)-ψ Form

Example 9

3 g. of (l)-ψ-1-(4-nitro-1-naphthyl)-2-cyanoacetamidopropane-1,3-diol is refluxed with 200 cc. of 5% hydrochloric acid for three hours and then the reaction mixture is evaporated to dryness in vacuo. The residual (l)-ψ-1-(4-nitro-1-naphthyl)-2-aminopropane-1,3-diol hydrochloride is taken up in water and the solution made alkaline to pH 10 with sodium hydroxide and then extracted with ethyl acetate. The combined extracts are dried and the ethyl acetate removed by distillation under reduced pressure to obtain the desired (l)-ψ-1-(4-nitro-1-naphthyl)-2-aminopropane-1,3-diol of the formula,

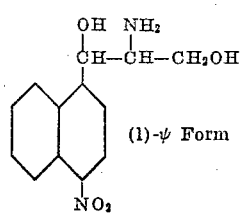
(l)-ψ Form

Example 10

.4 g. of (l)-reg.-1-(4-nitro-1-naphthyl)-2-succinamido-1,3-bis(nicotinyloxy)propane is refluxed with 80 cc. of 5% hydrochloric acid for five hours. The reaction mixture is evaporated to dryness in vacuo and the desired amino diol is taken up with water. The solution is made alkaline to pH 10 with sodium hydroxide solution, extracted with ethyl acetate and the solvent distilled from the extract to obtain the free base of (l)-reg.-1-(4-nitro-1-naphthyl)-2-aminopropane-1,3-diol of the formula,

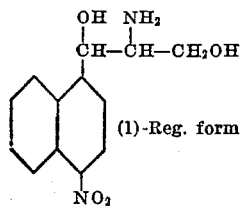
(l)-Reg. form

In the foregoing examples we have employed a new class of acylated amino diols as starting materials. The starting materials can be prepared in a number of different ways. One of the general methods which can be used to prepare the acylated amino diols is shown in the following diagram:

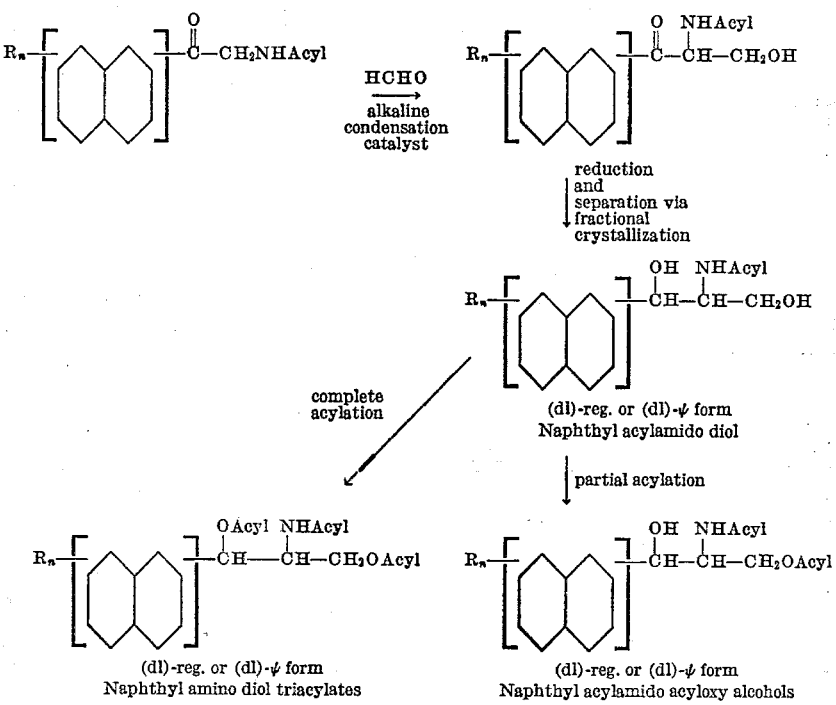

where R and n have the same significance as given above. The preparation of the unresolved starting materials has not been shown one the above diagram but these products may be prepared by the indicated processes by omitting the steps of separating the structural and optical isomers. The following examples serve to illustrate the application of this general method for the preparation of some of the specific starting materials used in the foregoing examples.

(a) 60 g. of 1-naphthyl acetamidomethyl ketone is mixed with 300 cc. of methanol and 75 cc. of 40% formalin. 2 g. of sodium bicarbonate is added and the mixture stirred at room temperature for about one hour during which time the desired product separates. The insoluble 1-naphthyl α-acetamido-β-hydroxyethyl ketone of formula,

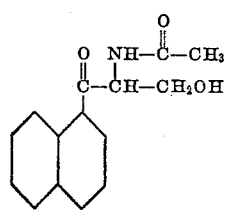

is collected and purified by recrystallization from ethyl acetate.

(b) A mixture consisting of 53 g. of 1-naphthyl α-acetamido-β-hydroxyethyl ketone, 75 g. of aluminum isopropylate and 1 liter of isopropanol is heated under reflux in an atmosphere of nitrogen for about five hours. During the refluxing period the acetone which has formed is distilled off from the mixture. The isopropanol is distilled from the reaction mixture under reduced pressure and the residue treated with about 1 liter of water. The mixture is heated to boiling to insure complete precipitation of the aluminum hydroxide, filtered while hot and the filtrate allowed to cool. The (dl)-ψ-1-(1-naphthyl)-2-acetamidopropane-1,3-diol which separates from the cooled solution is collected by filtration and purified by recrystallization from dilute ethanol. The formula of this product is,

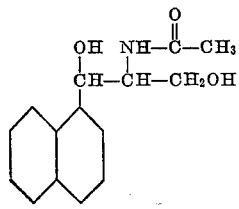

(dl)-ψ Form

If desired, additional quantities of the (dl)-ψ-structural isomer and also the corresponding (dl)-reg.-1-(1-naphthyl)-2-acetamidopropane-1,3-diol may be recovered from the aqueous filtrates by saturation of the filtrate with salt, exhaustive extraction with ethyl acetate, and followed by disillation of the ethyl acetate from the extract. The residue which consists of a mixture of the two structural forms is separated by crystallization from water or dilute ethanol.

(c) 5.0 g. of (dl)-ψ-1-(1-naphthyl)-2-acetamidopropane-1,3-diol is heated with 5 cc. of acetic anhydride at 70° C. for fifteen minutes. The reaction mixture is evaporated to dryness in vacuo and the residue is recrystallized from ethanol. The (dl)-ψ-1-(1-naphthyl)-2-acetamido-3-acetoxypropane-1-ol, which results, has the formula,

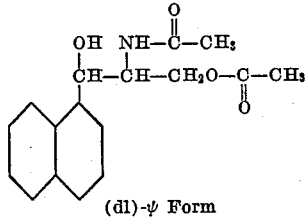

(dl)-ψ Form (d) 5 g. of (dl)-ψ-1-(1-naphthyl)-2-acetamido-3-acetoxypropane-1-ol is treated with 5 g. of acetic anhydride in 10 ml. of dry pyridine. The mixture is heated at 60° C. for two hours and is then diluted with water, extracted with ethyl acetate and the ethyl acetate extract washed successively with dilute hydrochloric acid, sodium bicarbonate solution and water. The organic layer is dried and the ethyl acetate distilled in vacuo to obtain (dl)-ψ-1-(1-naphthyl)-2-acetamido-1,3-diacetoxypropane of the formula,

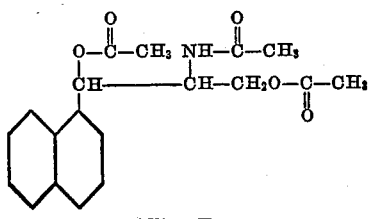

(dl)-ψ Form

While the above examples of the preparation of starting materials describe only the naphthyl derivatives unsubstituted in the ring, it should be understood that said examples are fully operative where the naphthalene ring does carry substituents in conformance with the designation of the symbols R and $n$ as previously described.

What we claim is:

1. A compound of the class consisting of a free base and its acid addition salts, said free base having the formula,

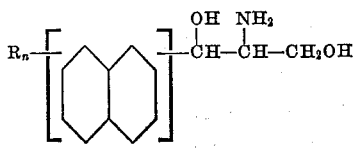

where $n$ is one of the integers 1 and 2 and R is a member of the class consisting of hydrogen, halogen, nitro, lower alkyl, and lower alkoxy radicals.

2. A 1-(1-naphthyl)-2-aminopropane-1,3-diol compound of the formula,

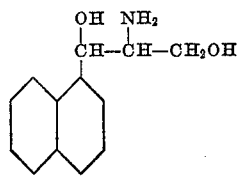

3. (dl)-ψ-1-(1-naphthyl)-2-aminopropane-1,3-diol.

4. (l)-ψ-1-(1-naphthyl)-2-aminopropane-1,3-diol.

5. A 1-(4-nitro-1-naphthyl)-2-aminopropane-1,3-diol compound of the formula,

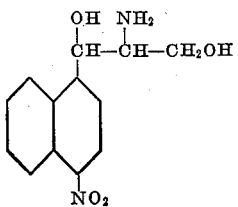

6. (dl)-ψ-1-(4-nitro-1-naphthyl)-2-aminopropane-1,3-diol.

7. (l)-ψ-1-(4-nitro-1-naphthyl)-2-aminopropane-1,3-diol.

8. An acid addition salt of a 1-(4-nitro-1-naphthyl)-2-aminopropane-1,3-diol compound having the formula,

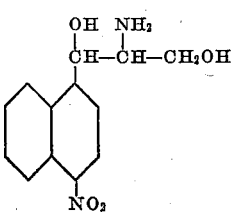

9. The (d)-tartaric acid salt of (l)-ψ-1-(4-nitro-1-naphthyl)-2-aminopropane-1,3-diol.

LOREN M. LONG.
HARVEY D. TROUTMAN.

No references cited.